United States Patent [19]

DeBisschop et al.

[11] Patent Number: 5,580,180

[45] Date of Patent: Dec. 3, 1996

[54] ONE-PIECE STAMPED CLAMP YOKE

[75] Inventors: James G. DeBisschop, Morris; William E. Korzan, Bethlehem, both of Conn.

[73] Assignee: The Torrington Company, Torrington, Conn.

[21] Appl. No.: 432,552

[22] Filed: May 1, 1995

[51] Int. Cl.$^6$ ............................ F16D 3/16; F16C 11/06
[52] U.S. Cl. .................. 403/157; 403/52; 72/379.2; 464/134
[58] Field of Search .................... 403/52, 57, 157, 403/158; 72/379.2; 464/134, 135, 905

[56] References Cited

U.S. PATENT DOCUMENTS

| | | | |
|---|---|---|---|
| 1,742,689 | 1/1930 | Chandler. | |
| 1,903,863 | 4/1933 | Hayden. | |
| 2,208,547 | 7/1940 | Murphy | 403/57 X |
| 4,361,024 | 11/1982 | Haldric | 72/379.2 |
| 4,365,909 | 12/1982 | Stephan | 403/157 |
| 4,505,608 | 3/1985 | Haldric | 403/13 |
| 4,646,552 | 3/1987 | Kanbe | 72/379.2 X |
| 5,188,474 | 2/1993 | Ohkubo et al. | 72/379.2 X |
| 5,403,111 | 4/1995 | Wey | 464/134 X |

FOREIGN PATENT DOCUMENTS

| | | | |
|---|---|---|---|
| 195544 | 12/1982 | Japan | 72/379.2 |
| 1214244 | 12/1970 | United Kingdom | 464/134 |

*Primary Examiner*—Anthony Knight
*Attorney, Agent, or Firm*—Michael H. Minns

[57] ABSTRACT

A clamp yoke formed from a flat piece of metal. The flat piece being approximately T-shaped which is bent into the clamp yoke. The top portion of the T forming the yoke ears and the vertical portion forming two approximately parallel shaft portions. The yoke ears each having a bearing bore and the shaft portions each having a shaft receiving bore. The clamp yoke can be provided with a bolt having a reduced diameter middle which allows a shaft to be inserted into the shaft receiving bores without removing the bolt. The bolt is then tightened, drawing the larger diameter portion into the center of the clamp yoke where the bolt engages a transversely relieved portion on the shaft to axially retain the shaft.

28 Claims, 4 Drawing Sheets

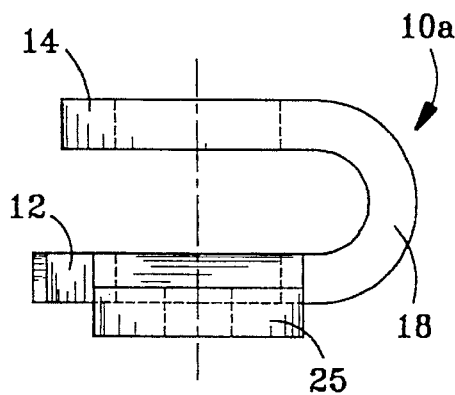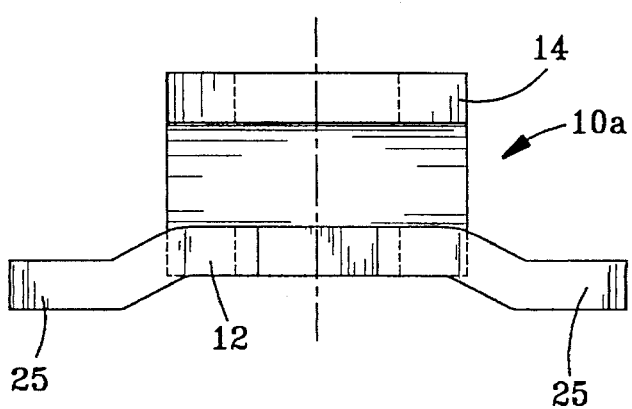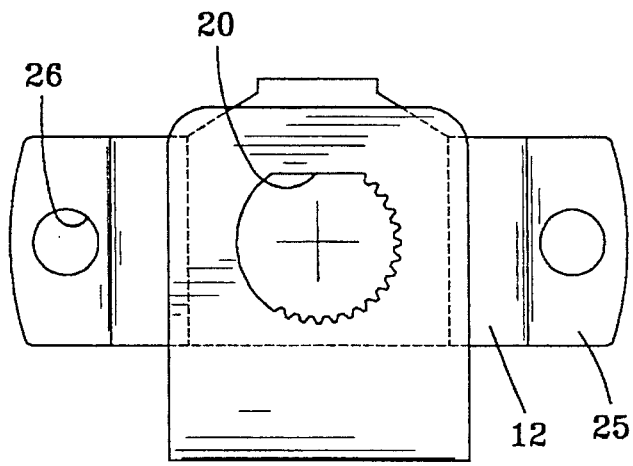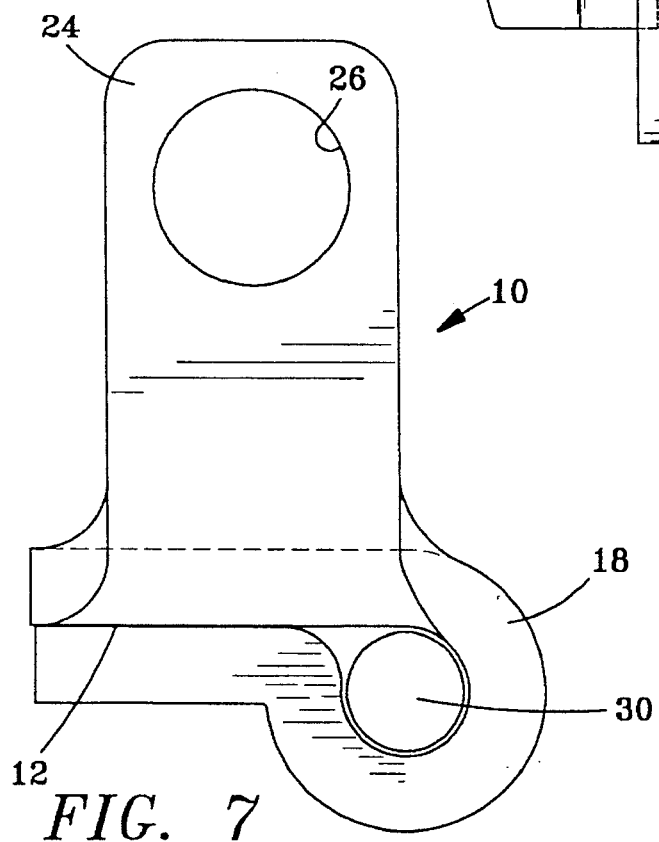
FIG. 8
FIG. 9
FIG. 10
FIG. 7

ONE-PIECE STAMPED CLAMP YOKE

BACKGROUND OF THE INVENTION

This invention relates generally to shaft connecting devices and more particularly to steering shaft clamp yokes.

Existing clamp yokes are typically formed from a single solid piece of metal. In some processes for forming these solid clamp yokes, excess material is scrapped and the process can require extra secondary machining steps after the basic clamp yoke is formed. With the continued reduction is the size of a typical automotive vehicle, the size and weight of the various components becomes important. When working with a solid clamp yoke, it can be difficult to achieve further size and weight reductions.

The foregoing illustrates limitations known to exist in present steering shaft clamp yokes. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for forming a clamp comprising: providing a flat clamp form, the flat clamp form having a first extended portion connecting to a second extended portion, the second extended portion extending from the middle of the first extended portion at a 90 degree angle thereto, the second portion having a free end, each end of the first extended portion forming an ear portion; and bending the free end of the second extended portion until the free end of the second extended portion generally opposes the connected end of the second extended portion.

In another aspect of the present invention, this is accomplished by providing monolithic clamp comprising: two ear portions, each ear portion having a bore therethrough; a first shaft receiving portion connecting the ear portions; a second shaft receiving portion generally opposed to the first shaft receiving portion and being connected to the first shaft receiving portion by an arcuate portion; each of the first and second shaft receiving portions having a shaft receiving bore in common axis alignment therethrough; and a slot extending through the arcuate portion from one shaft receiving portion bore to the other shaft receiving portion bore.

The foregoing and other aspects will become apparent from the following detailed description of the invention when considered in conjunction with the accompanying drawing figures.

BRIEF DESCRIPTION OF THE DRAWING FIGURES

FIG. 7 is a side view of alternate embodiment of a one-piece stamped clamp yoke;

FIG. 8 is a side view of a further embodiment of a one-piece stamped clamp;

FIG. 9 is a front view of the one-piece clamp shown in FIG. 8; and

FIG. 10 is a plan view of the one-piece stamped clamp shown in FIG. 8.

DETAILED DESCRIPTION

It is an object of this invention to produce a universal joint clamp yoke which can be produced by a stamping process with a minimum of secondary operations, is light weight, makes efficient use of material and is low cost. The present invention is a clamp yoke which is produced on a progressive stamping die except for qualifying the bearing bores and the attachment holes due to the required tolerances for these items. The clamp yoke is designed to retain the clamping bolt and nut in place as an assembly aid, and to ensure that the proper fasteners are used for each assembly. The bolt and nut can be designed so that the clamp yoke can be assembled to the shaft, and, if the bolt should loosen in use, the clamp yoke will not separate from the shaft without first becoming loose, making the operator of the vehicle aware of the defect, thereby allowing corrective action.

Figure 1:
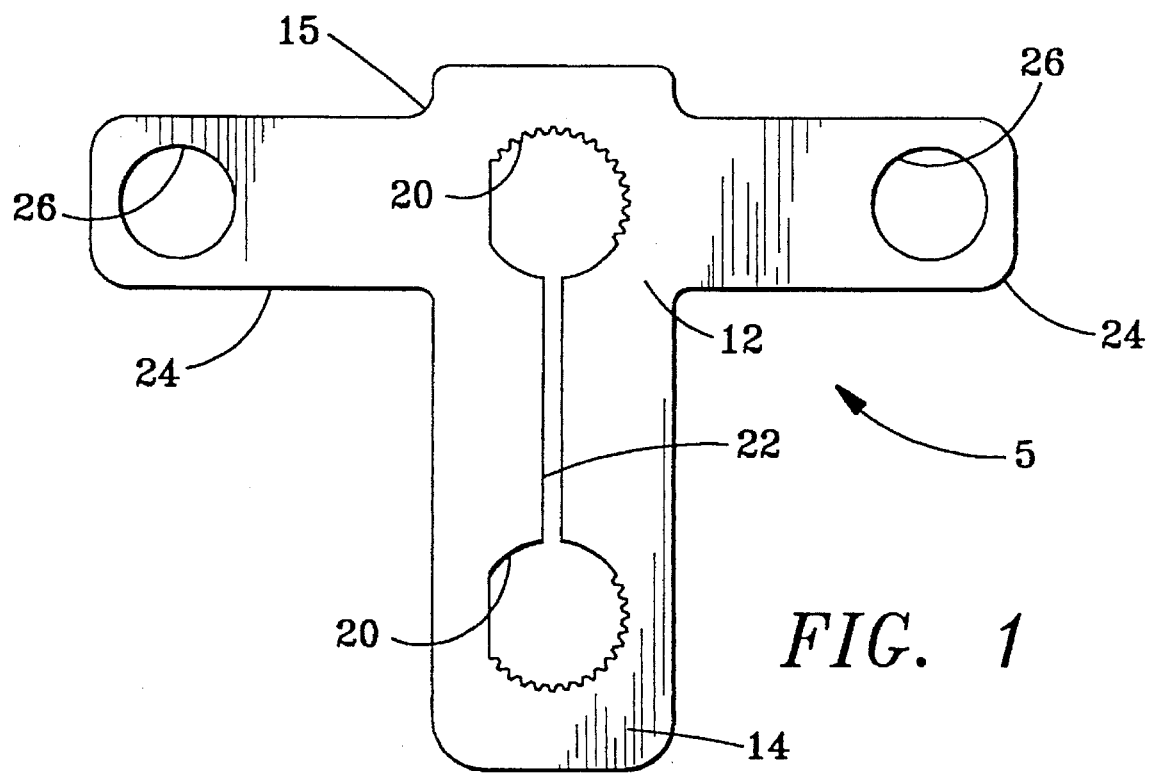
FIG. 1 is a plan view of a flat strip one-piece stamped clamp yoke, prior to bending.
Figure 2:
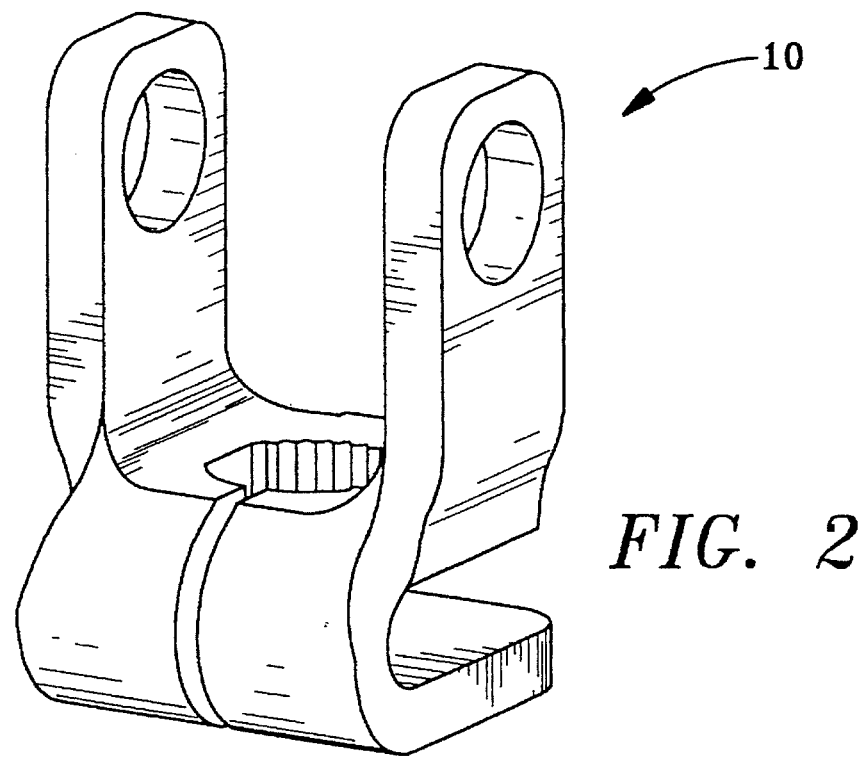
FIG. 2 is a perspective view of a one-piece stamped clamp yoke of the present invention.

Preferably, forming of the clamp yoke 10 begins with a flat strip of metal. A flat clamp yoke form 5 is formed from the strip of metal by a shearing operation. This flat clamp yoke form 5 has a T-shape with the top of the T having two yoke ear portions 24. Each ear portion 24 has a bearing bore 26 therethrough. The center of the top of the T connects the two ear portions 24 by a first shaft receiving portion 12. The first shaft receiving portion 12 contains one of two shaft receiving bores 20. Preferably, each shaft receiving bore 20 has a profiled shape which matches a profiled shape of a shaft 40. The bottom of the T forms a second shaft receiving portion 14 and contains the other shaft receiving bore 20. A clamping slot 22 can be provided in the flat clamp yoke form 5. If provided, the clamping slot 22 extends from one shaft receiving bore 20 to the other shaft receiving bore 20. In another embodiment of the present invention, the bearing bores 26 and/or the shaft receiving bores 20 are formed after the flat clamp yoke form 5 is bent into the shape shown in FIG. 2. In this instance, pilot holes can be formed in the flat clamp yoke form 5 at the centers of bearing bores 26 and shaft receiving bores 20.

After shearing the basic flat clamp yoke form 5 from a flat strip, the form 5 is processed in a progressive die. The ear portions 24 are bent upwards from the flat clamp yoke form 5 until the ear portions 24 are generally opposed from one another, are approximately 90 degrees from the first shaft receiving portion 12 and the bearing bores 26 are aligned on a common axis. The second shaft receiving portion 14 is then bent until the second shaft receiving portion 14 is generally opposed from the first shaft receiving portion 12, is approximately parallel to the first shaft receiving portion 12 and the shaft receiving bores 20 are aligned on a common axis. The bent area between the first shaft receiving portion 12 and the second shaft receiving portion 14 forms an arcuate portion or bolt engaging fold 18.

The ear portions 24 can be bent first before the second shaft receiving portion 14 is bent or the second shaft receiving portion 14 can be bent before the ear portions 24 are bent. If the clamping slot 22 was not formed in the basic flat clamp yoke form 5, the clamping slot 22 is cut into the clamp yoke 10 after being bent in the progressive die. Although the flat clamp yoke form 5 shows the ear portions 24 being connected to first shaft receiving portion 12 with a small radius 15, other radii, shapes or chamfering can be used to optimize the bending operation and to optimize the final shape of the clamp yoke 10.

Figure 3:
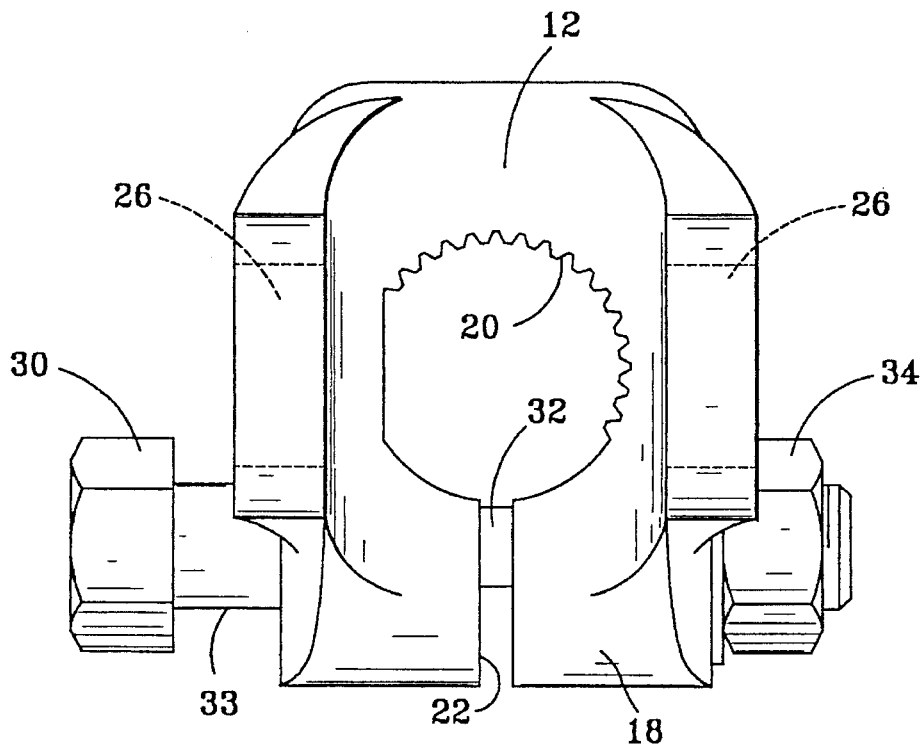
FIG. 3 is top view of the one-piece stamped clamp yoke shown in FIG. 2 with a clamping bolt installed.
Figure 4:
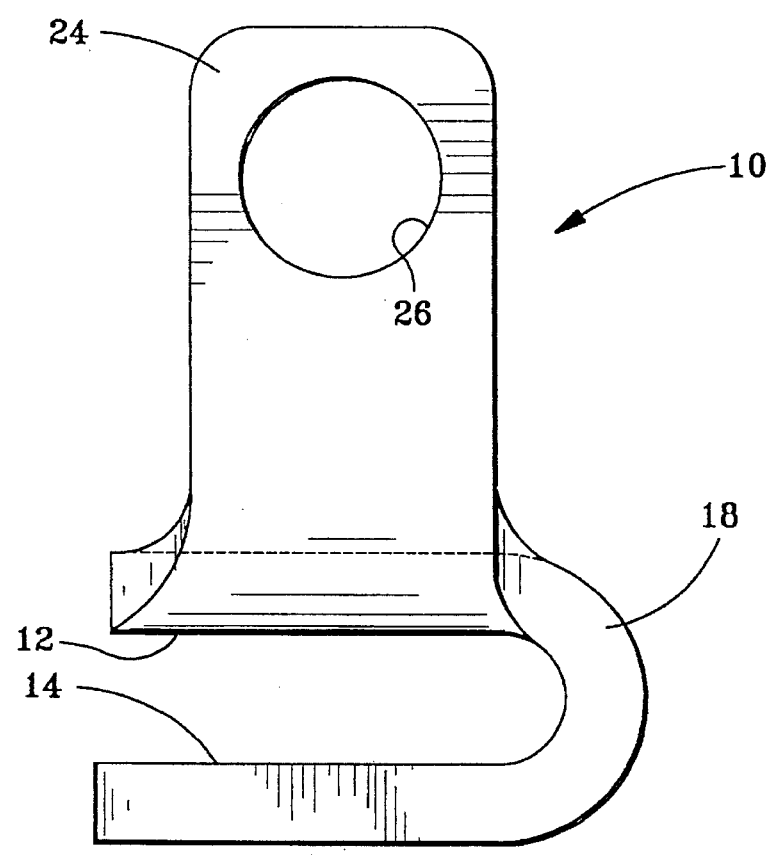
FIG. 4 is a side view of the one-piece stamped clamp yoke shown in FIG. 2.
Figure 5:
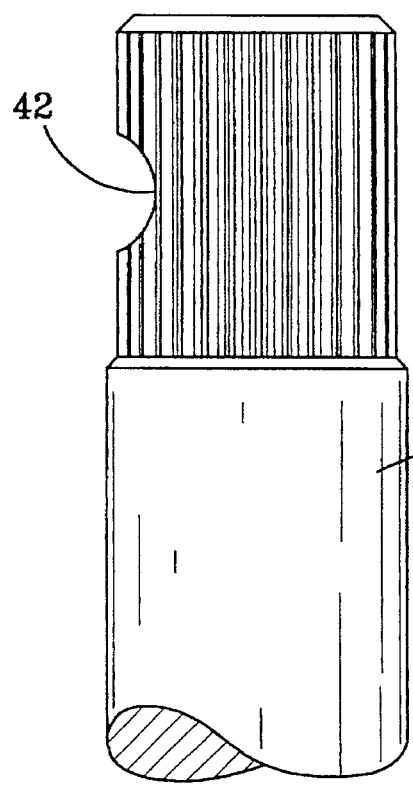
FIG. 5 is a side view of a portion of a shaft for use with the one-piece stamped clamp yoke shown in FIG. 2.
Figure 6:
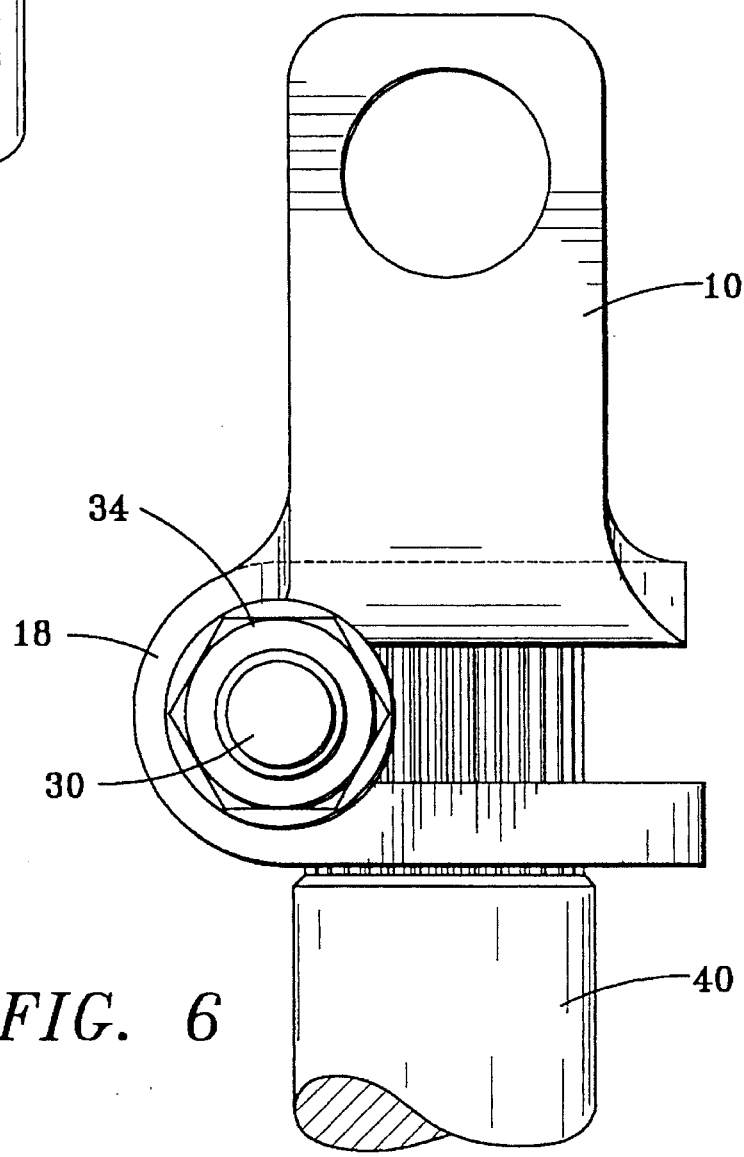
FIG. 6 is a side view of the one-piece stamped clamp yoke shown in FIG. 2 with the shaft shown in FIG. 5 installed.

FIG. 3 shows one embodiment of the clamp yoke 10 with a clamping bolt 30 and nut 34 installed in the area subtended by the arcuate portion 18. The clamping bolt 30 has a minor diameter or reduced diameter portion 32 which, prior to installation, is positioned adjacent the clamping slot 22. A shaft 40 having a transverse relieved area 42 near the end of the shaft 40 is inserted into the shaft receiving bores 20. The minor diameter portion 32 of the clamping bolt 30 permits the shaft 40 to be inserted into the shaft receiving bores 20 without removing the clamping bolt 30. In place of a reduced diameter, the bolt 30 could have a relieved area, such as a flat, which permits the shaft 40 to be inserted past the bolt 30. As the nut 34 is tightened, the larger or major diameter portion 33 of the clamping bolt 30 is drawn into and engages the transverse relieved area 42, thereby axially restraining the shaft 40 in the clamp yoke 10. The clamp yoke 10 is also tightened down against the shaft 40 as the clamping slot 22 closes. This prevents angular or rotational movement of the shaft 40 in the clamp yoke 10 and provides further axial retention of the shaft 40. In the event nut 34 loosens, the major diameter portion 33 provides axial retention of the shaft 40, even though the shaft 40 may be loose within the clamp yoke 10.

Another embodiment of the clamp yoke 10 is shown in FIG. 7. In this embodiment, the second shaft receiving portion 14 has been further bent until the second shaft receiving portion 14 and the first shaft receiving 12 are in contiguous contact with one another. In this embodiment, the arcuate bolt engaging portion 18 completely encircles the bolt 30. In place of the nut 34, the bolt engaging portion 18 can be threaded to accept the threaded end of the bolt 30.

In a further embodiment of the present invention, a one-piece stamped clamp 10a is shown in FIGS. 8 through 10. Clamp 10a is also formed from a flat form similar to the process described for clamp yoke 10. The first shaft receiving portion 12 has two foot portions 25 extending therefrom. The foot portions 25 are either in the same plane as first shaft receiving portion 12 or are in a plane slightly offset from the plane of first shaft receiving portion 12 and away from the second shaft receiving portion 14. When offset, this allows the clamp 10a to be attached to various components, such as a rubber coupling, and allow a slight clearance between the first shaft receiving portion 14 and the coupling. The second shaft receiving portion 14 can also be bent into the form shown in FIG. 7 where the first shaft receiving portion 12 and the second shaft receiving portion 14 are in contiguous contact.

Having described the invention, what is claimed is:

1. A method for forming a clamp comprising:

providing a flat clamp form, the flat clamp form having a first extended portion connected to a second extended portion, the second extended portion extending from the middle of the first extended portion at a 90 degree angle thereto, the second portion having a free end and a connected end, each end of the first extended portion forming an ear portion;

bending the free end of the second extended portion until the free end of the second extended portion generally opposes the connected end of the second extended portion;

forming a first shaft receiving bore in the middle of the first extended portion;

forming a second shaft receiving bore in the free end of the second extended portion, the first shaft receiving bore and the second shaft receiving bore being aligned on a common axis after the step of bending the free end of the second extended portion; and forming a slot in the second extended portion, the slot extending from the first shaft receiving bore to the second shaft receiving bore.

2. The method according to claim 1, further comprising:

bending the ear portions of the first extended portion until one ear portion is spaced apart and generally opposed from the other ear portion.

3. The method according to claim 2, further comprising:

forming a bore in each ear portion, wherein after the step of bending the ear portions one bore is aligned on a common axis with the other bore.

4. The method according to claim 2, wherein the step of bending the ear portions is performed before the step of bending the free end of the second extended portion.

5. The method according to claim 2, wherein the step of bending the free end of the second extended portion is performed before the step of bending the ear portions.

6. The method according to claim 1, further comprising:

forming a bore in each ear portion.

7. The method according to claim 1, further comprising:

bending the ear portions of the first extended portion until each ear portion lies in a common plane, the common plane being parallel to and offset from a plane in which the middle of the first extended portion lies.

8. The method according to claim 1, further comprising:

bending the free end of the second extended portion until the free end is parallel to and in contiguous contact with the connected end of the second extended portion.

9. The method according to claim 1, wherein the slot is formed by shearing the slot in the flat clamp yoke form prior to the bending step.

10. The method according to claim 1, wherein the slot is formed by cutting the slot in the clamp yoke after the bending step.

11. The method according to claim 1, wherein the step of bending the free end of the second extended portion forms an arcuate bolt engaging portion between the free end of the second extended portion and the connected end of the second extended portion; and further comprising:

inserting a bolt into the arcuate bolt engaging portion.

12. The method according to claim 11, wherein the step of bending the free end of the second extended portion includes bending the free end of the second extended portion until the arcuate bolt engaging portion subtends more than 180 degrees, thereby providing transverse retention of the bolt.

13. The method according to claim 1, wherein the steps of forming the first shaft receiving bore and the second shaft receiving bore are performed after the step of bending the free end of the second extended portion.

14. The method according to claim 1, wherein the steps of forming the first shaft receiving bore and the second shaft receiving bore are performed before the step of bending the free end of the second extended portion.

15. A method for forming a clamp yoke comprising:

providing a flat metal strip;

shearing the strip into a flat clamp yoke form, the flat clamp yoke form having a first extended portion connecting to a second extended portion, the second extended portion extending from the middle of the first extended portion at a 90 degree angle thereto, the second portion having a free end and a connected end, each end of the first extended portion forming an ear portion;

bending the ear portions of the first extended portion until one ear portion is spaced apart and generally opposed from the other ear portion;

bending the free end of the second extended portion until the free end of the second extended portion is spaced apart and generally opposed the connected end of the second extended portion;

forming a bearing bore in each ear portion, one bearing bore being aligned on a common axis with other bearing bore after the step of bending the ear portions;

forming first shaft receiving bore in the middle of the first extended portion;

forming a second shaft receiving bore in the free end of the second extended portion, the first shaft receiving bore being aligned on a common axis with the second shaft receiving bore after the step of bending the free end of the second extended portion; and forming a slot in the second extended portion, the slot extending from the first shaft receiving bore to the second receiving bore.

16. The method according to claim 15, wherein the steps of forming bearing bores, first shaft receiving bore and second shaft receiving bore are performed after the steps of bending the ear portions and bending the free end of the second extended portion.

17. The method according to claim 15, wherein the steps of forming bearing bores, first shaft receiving bore and second shaft receiving bore are performed before the steps of bending the ear portions and bending the free end of the second extended portion.

18. The method according to claim 15, further comprising:

bending the free end of the second extended portion until the free end is parallel to and in contiguous contact with the connected end of the second extended portion.

19. The method according to claim 15, wherein the slot is formed by shearing the slot in the flat clamp yoke form prior to the bending steps.

20. The method according to claim 15, wherein the slot is formed by cutting the slot in the clamp yoke after the bending steps.

21. A monolithic clamp comprising:

two ear portions, each ear portion having a bore therethrough;

a first shaft receiving portion connecting the ear portions;

a second shaft receiving portion generally opposed to the first shaft receiving portion and being connected to the first shaft receiving portion by an arcuate portion;

each of the first and second shaft receiving portions having a shaft receiving bore in common axis alignment therethrough; and a slot extending through the arcuate portion from one shaft receiving portion bore to the other shaft receiving portion bore.

22. The monolithic clamp according to claim 21, wherein the two ear portions form a yoke, one ear portion being spaced apart and generally opposed from the other ear portion, each ear portion bore being aligned on a common axis.

23. The monolithic clamp according to claim 21, wherein the second shaft receiving portion is spaced apart from the first shaft receiving portion.

24. The monolithic clamp according to claim 21, wherein the second shaft receiving portion is in contiguous contact with the first shaft receiving portion.

25. The monolithic clamp according to claim 24, wherein the arcuate portion forms a tubular bolt receiving hole.

26. The monolithic clamp according to claim 25, wherein a portion of the tubular bolt receiving hole is threaded.

27. The monolithic clamp according to claim 21, further comprising:

a bolt and nut positioned within and extending beyond the arcuate portion.

28. A method for forming a clamp comprising:

providing a flat clamp form, the flat clamp form having a first extended portion connected to a second extended portion, the second extended portion extending from the middle of the first extended portion at a 90 degree angle thereto, the second portion having a free end and a connected end, each end of the first extended portion forming an ear portion;

bending the free end of the second extended portion until the free end of the second extended portion generally opposes the connected end of the second extended portion;

forming a first shaft receiving bore in the middle of the first extended portion;

forming a second shaft receiving bore in the free end of the second extended portion, the first shaft receiving bore and the second shaft receiving bore being aligned on a common axis after the step of bending the free end of the second extended portion; and bending the free end of the second extended portion until the free end is parallel to and in contiguous contact with the connected end of the second extended portion.

* * * * *